(12) United States Patent
Engwer et al.

(10) Patent No.: US 7,039,190 B1
(45) Date of Patent: May 2, 2006

(54) WIRELESS LAN WEP INITIALIZATION VECTOR PARTITIONING SCHEME

(75) Inventors: Darwin A. Engwer, Pleasanton, CA (US); Jonathan M. Zweig, Cupertino, CA (US)

(73) Assignee: Nortel Networks Limited, St. Laurent (CA)

( * ) Notice: Subject to any disclaimer, the term of this patent is extended or adjusted under 35 U.S.C. 154(b) by 864 days.

(21) Appl. No.: 09/753,229

(22) Filed: Dec. 28, 2000

Related U.S. Application Data

(60) Provisional application No. 60/226,404, filed on Aug. 18, 2000.

(51) Int. Cl.
  *H04K 1/00* (2006.01)
(52) U.S. Cl. .................. 380/270; 380/262; 380/247
(58) Field of Classification Search ........... 380/270, 380/247, 51, 46, 262; 705/410
  See application file for complete search history.

(56) References Cited

U.S. PATENT DOCUMENTS

| | | | |
|---|---|---|---|
| 5,239,584 A * | 8/1993 | Hershey et al. ............... 380/28 |
| 5,444,781 A * | 8/1995 | Lynn et al. .................... 380/46 |
| 5,454,026 A | 9/1995 | Tanaka |
| 5,673,319 A * | 9/1997 | Bellare et al. ............... 713/181 |
| 5,715,164 A * | 2/1998 | Liechti et al. ............... 705/410 |
| 5,953,426 A * | 9/1999 | Windel et al. ................ 380/51 |
| 5,987,062 A | 11/1999 | Engwer et al. |
| 6,055,316 A * | 4/2000 | Perlman et al. ............. 380/262 |
| 6,215,876 B1 * | 4/2001 | Gilley .......................... 380/260 |
| 6,330,231 B1 | 12/2001 | Bi |
| 2001/0048744 A1 * | 12/2001 | Kimura ....................... 380/247 |
| 2002/0009199 A1 * | 1/2002 | Ala-Laurila et al. ........ 380/247 |

OTHER PUBLICATIONS

Chi-Chun Lo, et al. "QoS provisioning in handoff algorithms for wireless LAN", International Zurich Seminar on Broadband Communications. Accessing, Transmission, Networking, Feb. 17, 1998, pp. 9-16, XP002151137.

"IEEE standard for information technology-telecommunications and information exchange between systems-local and metropolitan area networks-specific requirement. Part 11: wireless LAN medium access control (MAC) and physical layer (PHY) specification. (ISO/IEC 8802-11, ANSI/IEEE Std 802.11-1999)" Aug. 20, 1999, pp. 38-54, XP002206839.

\* cited by examiner

*Primary Examiner*—Ayaz Sheikh
*Assistant Examiner*—Arezoo Sherkat
(74) *Attorney, Agent, or Firm*—Blakely Sokoloff Taylor & Zafman, LLP

(57) ABSTRACT

In one embodiment, an authentication method features the generation of an initialization vector at a first electronic device and the determination at the first electronic device whether the initialization vector falls within a first group of initialization vectors. The first group includes a plurality of initialization vectors solely used in connection with an authentication sequence. Information is encrypted using in part the initialization vector for return to a second electronic device if the initialization vector falls within the first group.

27 Claims, 5 Drawing Sheets

WIRELESS LAN WEP INITIALIZATION VECTOR PARTITIONING SCHEME

This application claims benefit of U.S. Provisional Application No. 60/226,404, filed Aug. 18, 2000.

FIELD OF THE INVENTION

The present invention relates to the field of networking. In particular, this invention relates to a technique for providing enhanced security for transmissions over a wireless local area network.

BACKGROUND OF THE INVENTION

The ability of users to access programs and share data over local area networks (referred to as "LANs") has become a necessity for most working environments. To improve efficiency and ease of use, certain enhancements may be added to a LAN such as remote wireless access. By providing remote wireless access, a wireless LAN (WLAN) is formed.

As described in U.S. Pat. No. 5,987,062 issued to Netwave Technologies, Inc., now owned by Nortel Networks Limited, one type of WLAN employs dedicated stations, which are referred to as access points (APs). Therein, each AP is a relay station that includes a radio frequency (RF) transceiver that receives radio data packets over a communication channel from mobile units. Of course, each AP also transmits radio data packets over the communication channel to the mobile units.

To discourage an interloper from eavesdropping on communications between an AP and a mobile unit, a data confidentiality algorithm may be utilized within a WLAN. In accordance with Institute of Electrical and Electronics Engineers (IEEE) 802.11, this data confidentiality algorithm is referred to as "wired equivalent privacy" (WEP). In general, WEP is a symmetric key algorithm that is configured to encrypt information with a combination of a secret key and an initialization vector (described below) prior to transmission over a wireless link. This prevents an interloper from obtaining an unauthorized, non-encrypted copy of data communicated between an AP and its mobile units.

As shown in FIG. 1, a block diagram of a WEP shared key authentication sequence is shown. In general, a mobile unit 10 issues an authentication request 100 to an access point (AP) 20. In response, the AP 20 returns a challenge text 110. Herein, the "challenge text" 110 is a sequence of alphanumeric characters approximately 128 bytes in size and generated by the AP 20. Upon receipt, the challenge text 110 is encrypted using a secret key 120 that was previously negotiated by the mobile unit 10 and the AP 20, concatenated with a series of bits of a predetermined number, referred to as an "initialization vector" (IV) 130. The IV 130 is concatenated with the encrypted challenge text and transmitted. This produces a "challenge response" 140, which is sent to the AP 20.

Upon receiving the challenge response 140, if the AP 20 is able to recover the challenge text 110 using its own stored version of the secret key 120, the mobile unit 10 is authenticated. Otherwise, the mobile unit 10 is not authenticated and the AP 20 will not receive and process its transmitted data.

Although WEP provides greater security to communications between the AP and its mobile units, the content of these communications is still subject to attack. For example, an interloper can monitor authentication sequences between the mobile units and an AP. As shown, from the authentication sequence, an interloper can obtain an IV and a portion (approximately 128 bytes) of the keying material (based on the secret key and initialization vector) by performing an exclusive-or (XOR) operation on both the encrypted challenge text and the challenge text 110. By maintaining a record of the IVs and their portion of keying material, an interloper can decrypt an amount of encrypted information without knowledge of the secret key.

SUMMARY OF THE INVENTION

The invention relates to partitioning of the initialization vectors (IVs). Certain IVs are reserved for use in connection with the WEP authentication sequence while the remaining IVs are reserved for encrypting and decrypting communications not involving authentication. This mitigates the likelihood of a successful attack on transmissions over a wireless local area network by an eavesdropper using key sequences recovered from an authentication t event to decrypt data. Optionally, this prevents replay attacks from being used.

Other aspects and features of the present invention will become apparent to those ordinarily skilled in the art upon review of the following description of specific embodiments of the invention in conjunction with the accompanying claims and figures.

BRIEF DESCRIPTION OF THE DRAWINGS

The features and advantages of the present invention will become apparent from the following detailed description of the present invention in which.

DETAILED DESCRIPTION OF THE INVENTION

Herein, the exemplary embodiments of the present invention relate to a technique for enhancing the level of security provided by a wired equivalent privacy (WEP) protocol for information transmitted over a wireless local area network. This enhanced security is provided through initialization vector (IV) partitioning. In particular, only certain IVs may be used for WEP authentication while other IVs may be used for communications not involving authentication (hereinafter referred to as "data communications"). These embodiments are not exclusive; rather, they merely provide a thorough understanding of the present invention. Well-known circuits are not set forth in detail in order to avoid unnecessarily obscuring the present invention.

In the following description, certain terminology is used to describe features of the present invention. For example, "logic" includes hardware and/or software module(s) that perform a certain function on incoming information. A "software module" is executable code such as an operating system, an application or an applet for example. The term "information" is defined as data, address, and/or control. For transmission, the information may be placed in a frame featuring a single data packet or a series of data packets. A "link" is broadly defined as one or more information-carrying mediums to establish a communication pathway. Examples of the medium include a physical medium (e.g., electrical wire, optical fiber, cable, bus traces, etc.) or a wireless medium (e.g., air in combination with wireless signaling technology).

With respect to cryptographic functionality, a "hash function" is a program or a collective process for converting information into a value represented by a fixed bit length. Normally, hash functions are "one-way" so that there does not readily exist an inverse function to recover a portion of the original information from the hash value. Examples of a standard hash function include Secure Hash Algorithm (SHA-1) as specified by the National Institute of Standards and Technology located in Washington, D.C. The term "combined" is generally defined that an arithmetic operation such as concatenation, modular addition, hashing, or another mathematical operation.

Figure 2:
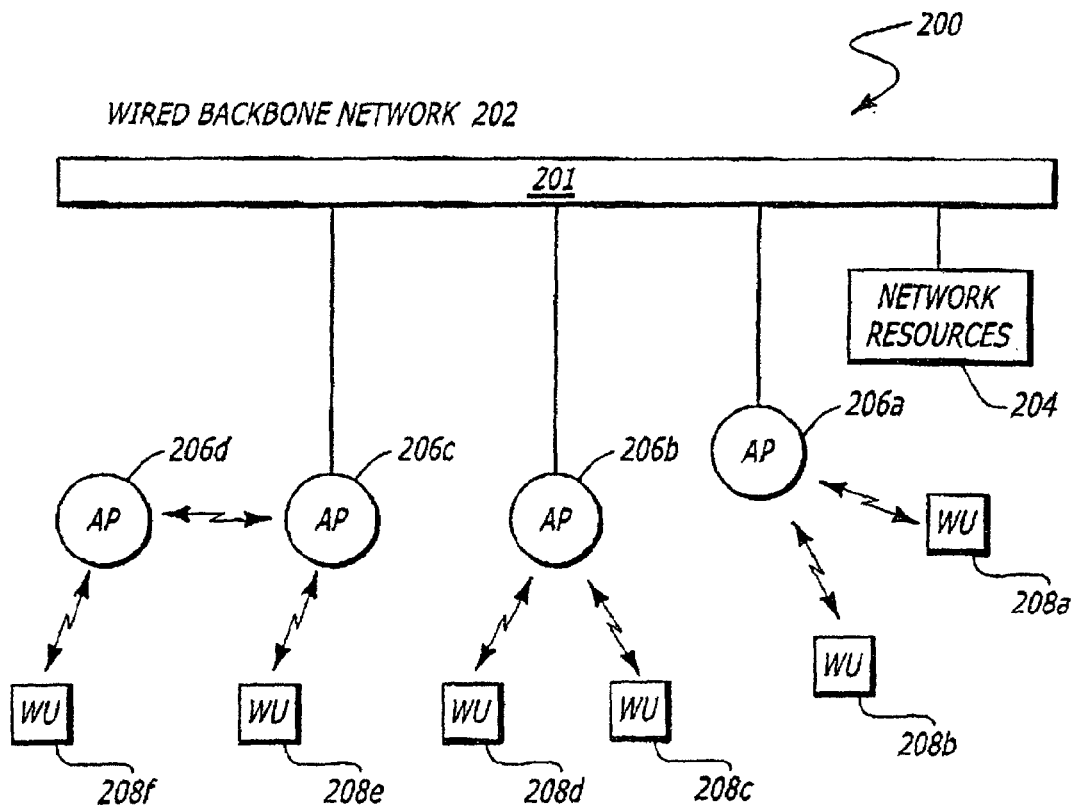
FIG. 2 is a first exemplary embodiment of a wireless network system.

Referring to FIG. 2, a first exemplary embodiment of a wireless network system 200 in accordance with the invention is illustrated. The wireless network system 200 comprises a link 201 based on a physical medium. Herein, the link 201 is part of a wired backbone network 202 that includes network resources 204 available for users of the system 200. The wireless network system 200 further includes one or more access points (APs) 206a–206d that communicate via a wireless link with one or more wireless units (WUs) 208a–208f. For this embodiment, four (4) APs 206a–206d communicate with four (4) WU 208a–208f.

Users using the WUs 208a–208f can access the network resources 204 via any of the APs 206a–206d, which are generally transparent bridges that link a wireless network defined by one or more WUs 208a–208f with the wired backbone network 202. The WUs 208a–208f communicate with the APs 206a–206d typically using a standardized protocol, such as the IEEE 802.11 protocol.

A "wireless unit" (WU) is defined herein as any electronic device comprising processing logic (e.g., a processor, microcontroller, state machine, etc.) and a wireless transceiver for receiving and transmitting data to an access point (AP) or another wireless unit (WU). Examples of a WU include a computer (e.g., desktop computer, laptop computer, hand-held computer such as a personal digital assistant "PDA", etc.), communications equipment (e.g., pagers, telephones, facsimile machine, etc.), a television set-top box, or appliances such as refrigerator pads, electronic picture frames, alarm detectors, water detectors, and the like.

An "access point" (AP) is a device that provides a bi-directional connection between one or more WUs and a network such as the wired backbone network 202. However, an AP could also have a wireless connection back to the backbone network 202, such as AP 206d, which has a wireless link to the backbone network 202 via another AP 206c. The wired backbone network 202 can be of any type, including an Ethernet, a token ring, and an asynchronous transfer mode (ATM) network.

Figure 3:
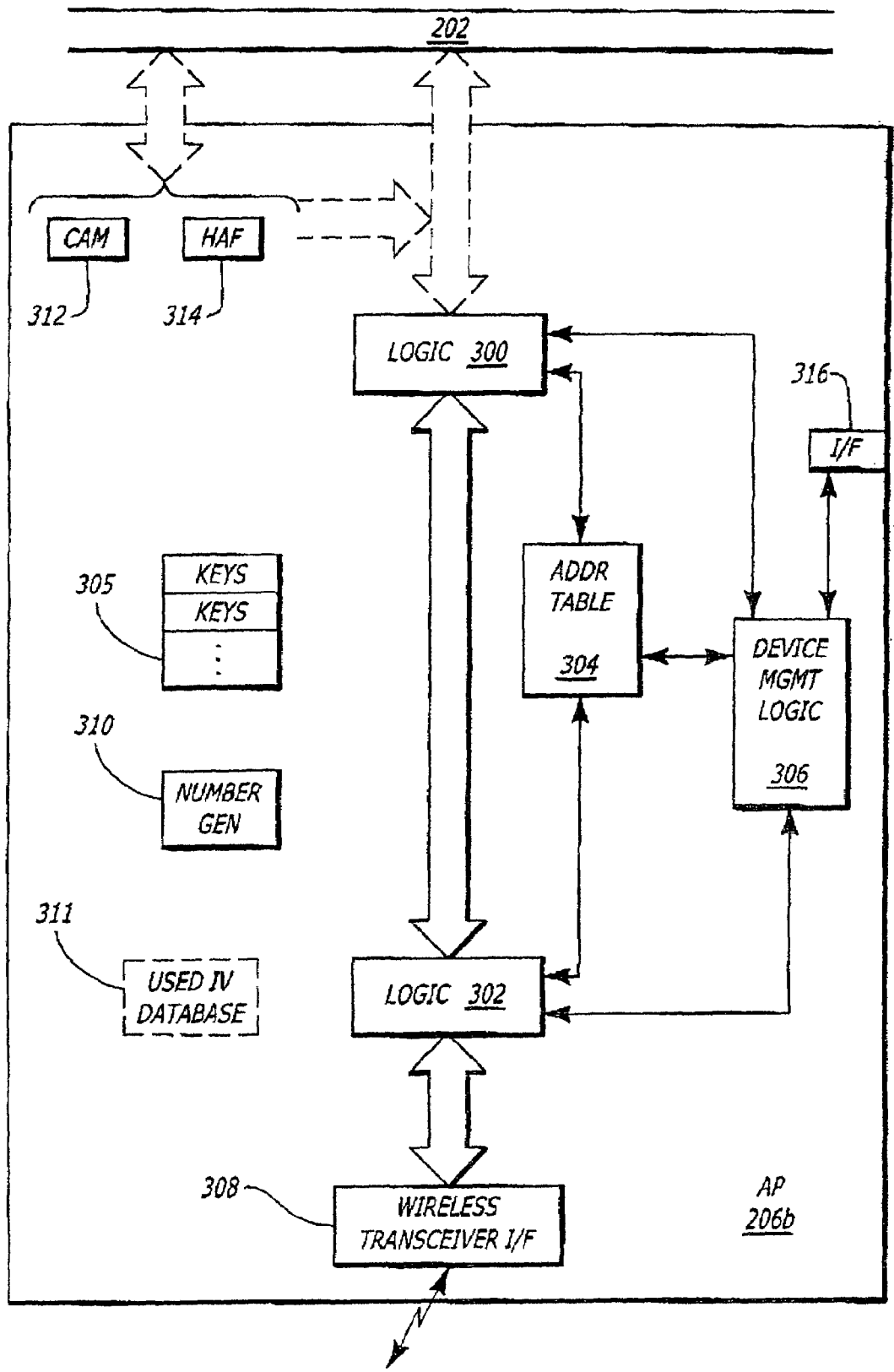
FIG. 3 is an exemplary embodiment of an access point (AP) for a wireless network system.

Referring now to FIG. 3, an exemplary embodiment of an access point (AP) is shown. For illustrative purposes, the access point is represented by AP 206b and differs in function from the access points described in U.S. Pat. No. 5,987,062. As shown, AP 206b comprises logic 300 and 302, an address table 304 and one or more keys 305, a device management logic 306, a wireless transceiver interface 308, a number generator 310 and an optional "used IV" database 311 to maintain a listing of IVs already used for authentication. In particular, the logic 300 is used to determine whether certain information from the wired backbone network 202 is destined for one or more of the WUs. The address table 304 includes Medium Access Control (MAC) addresses for all of the wireless units associated with the AP 206b such as WUs 208c and 208d of FIG. 2. In the special case of all broadcast or some multicast packets, the packets are addressed to all or some of the wireless units (WUs) associated with the access point (AP) on a "best effort" basis.

Similarly, as information from the wireless units (WU) is received by the wireless transceiver 308, the logic 302 monitors addresses within this information against the contents of the address table 304. One reason is that only information from authenticated and associated wireless units (e.g., WUs 208c and 208d) is accepted. Hence, if a non-authenticated wireless unit transmits packets, these packets will not be forwarded to the wired backbone network 202 of FIG. 1. The logic 302 subsequently transmits the information to the logic 300 for routing to the wired backbone network 202.

Figure 1:
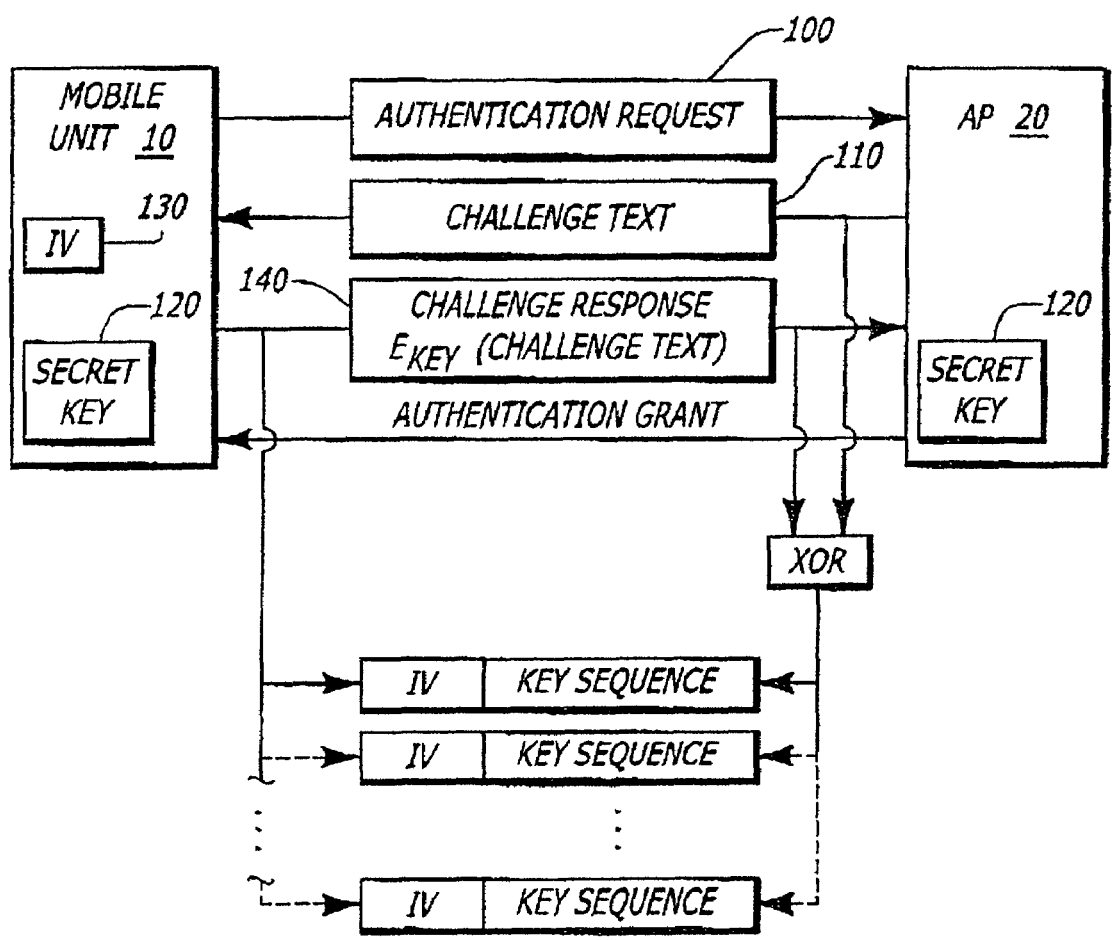
FIG. 1 is a block diagram of a conventional WEP authentication sequence with an interloper extracting pertinent information.

In the event that the fixed backbone network 202 of FIG. 1 has a substantially larger data rate than the wireless network, content addressable memory (CAM) 312 and a hardware address filter (HAF) 314 may be employed within the AP 206b. The CAM 312 and HAF 314 are in communication with the fixed backbone network 202 and collectively filter information at the hardware level so that the logic 300 processes only a small portion of the information routed over the wired backbone network 202.

The device management logic 306 provides a mechanism for adjusting the various parameters and controlling the functionality of the AP 206b. An example of one mechanism involves placement of an interface (e.g., serial) port 316 within the AP 206b. The interface 316 provides a direct connection to the AP 206b. Other mechanisms include (1) Simple Network Management Protocol (SNMP) management tools such as OPTIVITY® by Nortel Networks Limited of Montreal, Canada, (2) TELNET, or (3) web-based management software.

As shown, for this embodiment, the number generator 310 is employed within the AP 206b. Of course, it is contemplated that the number generator 310 may be employed in a wireless unit (WU) as well. In one embodiment, number generator 310 is a software-based pseudo-random number generator that produces a pseudo-random bit stream, which is utilized as an initialization vector (IV) as described in FIG. 4. An example of the pseudo-random number generator includes RC4, a software module produced by RSA Data Security, Inc. of Redwood City, Calif. In another embodiment, number generator 310 is a hardware-based random number generator that produces random bit patterns.

Referring back to FIG. 2, in the typical scenario, a WU associates itself with one of the APs to communicate with the wired backbone network 202. For instance, in the example shown in FIG. 2, WUs 208a and 208b are associated with AP 206a, WUs 208c and 208d are associated with AP 206b, WU 208e is associated with AP 206c, and WU 208*f* is associated with wireless AP 206*d*. Which access point (AP) a wireless unit (WU) is associated with can depend on many factors, including signal quality, load balancing, restricted links and other factors. The AP that a particular WU is associated with can change, such as when the WU "roams" from the coverage area of a particular AP to a coverage area of another AP. From the standpoint of the user using the WU, this change in associated AP is transparent. The WU must authenticate itself prior to this association.

Figure 4:
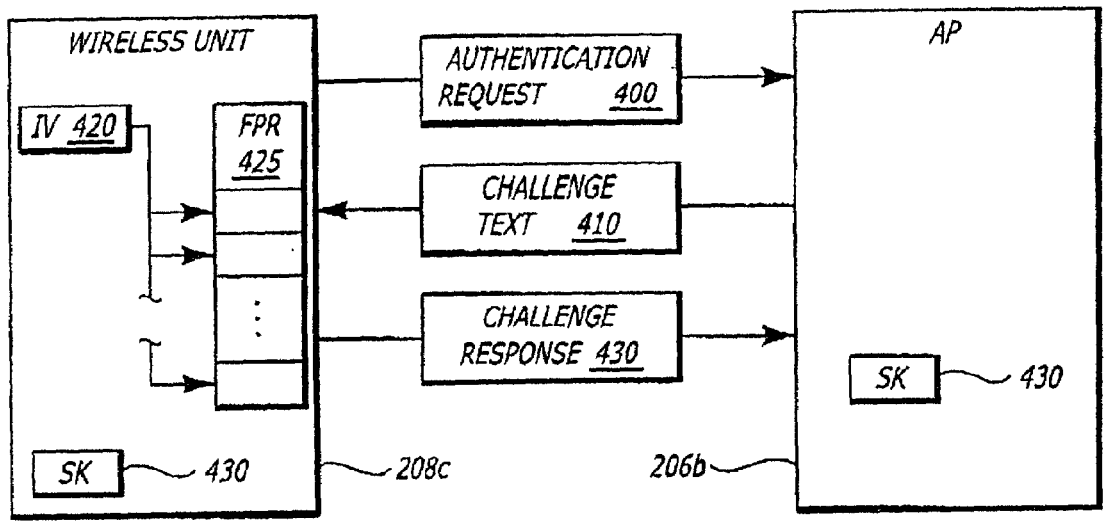
FIG. 4 is a first exemplary embodiment of a WEP authentication sequence for the present invention.

Referring now to FIG. 4, a first exemplary embodiment of a WEP authentication sequence for the present invention is shown. Herein, a wireless unit (e.g., wireless unit 208*c*) issues an authentication request 400 to an access point "AP (e.g., 206*b*). In response, the AP 206*b* generates a first sequence of bits that are referred to as a "challenge text" 410. Upon receipt of the challenge text 410, the wireless unit 208*c* generates a second sequence of bits referred to as an "initialization vector" (IV) 420.

Being 24-bits in length, the IV 420 is analyzed by the WU 208*c* in order to determine whether the IV 420 falls within a first group referred to as a first partitioned region (FPR) 425. If the IV 420 is determined to fall within the first partitioned region 425, the IV 420 is subsequently used in the authentication sequence. Otherwise, a new IV 420 is generated and analyzed until an IV in the first partition region 425 is generated. The "first partitioned region" 425 comprises a group of IV bit patterns that are solely used in connection with the authentication sequence. In one embodiment, the determination of whether the IV 420 falls within the first partitioned region 425 is accomplished by determining whether distinct field of bits have been set and/or cleared. For example, for an authentication sequence, the IV 420 may require that its four (4) most significant bits are set before transmitting the IV 420 as part of a return message to the AP 206*b*. Another example is that a select number of bits, either continuous or discontinuous are set. Yet another example would be to have the first partition region 425 be all numeric values within a certain range.

If the IV 420 falls within the first partitioned region 425, the challenge text 410 is encrypted based on the IV 420, combined with the shared secret key (SK) 430 that was previously negotiated by the wireless unit 208*c* and the AP 206*b* as described below in FIG. 6. The encrypted challenge text 410 and the IV 420 form a "challenge response" 440, which is sent to the AP 206*b*. If the AP 206*b* is able to recover the challenge text 410 using its pre-stored SK 430 and the IV 420, the wireless unit 208*c* is authenticated. Otherwise, the wireless unit 208*c* is not authenticated and the AP 206*b* will not receive and process information transmitted by the wireless unit 208*c*. If the AP 206*b* is maintaining the used IV database 311 and the IV 420 is contained within the database 311, then the wireless unit is not authenticated.

Figure 5:
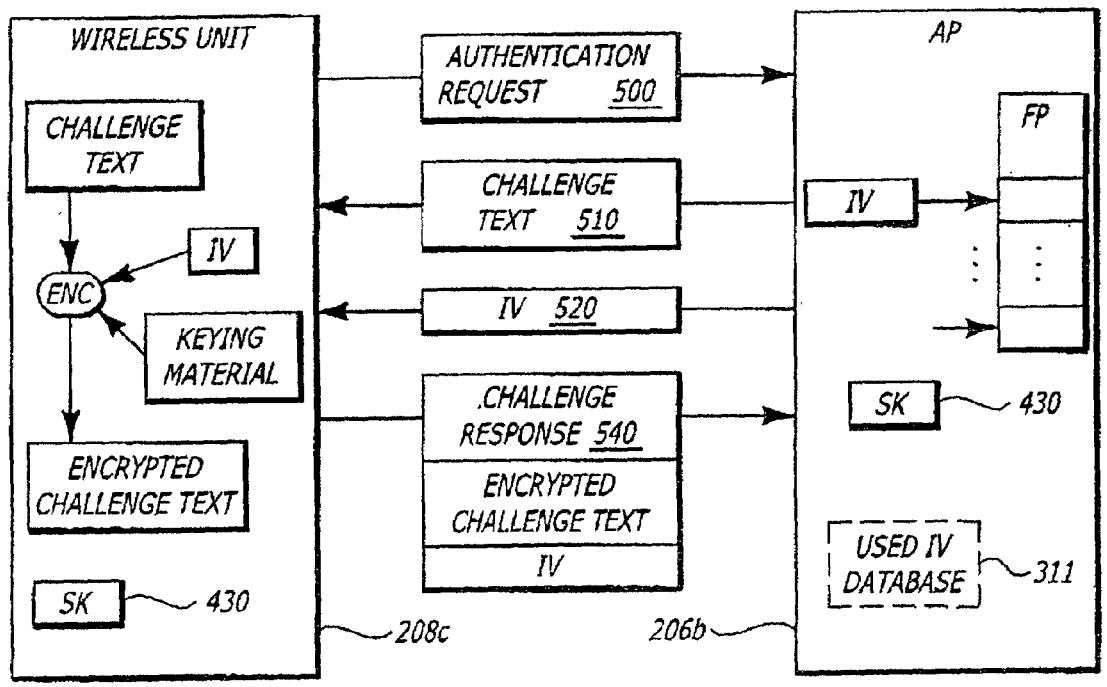
FIG. 5 is a second exemplary embodiment of a WEP authentication sequence for the present invention.

Referring now to FIG. 5, a block diagram of a second exemplary embodiment for a WEP authentication sequence of the present invention is shown. Herein, a wireless unit (e.g., wireless unit 208*c*) issues an authentication request 500 to an access point "AP" (e.g., AP 206*b*). In response, the AP 206*b* generates a first sequence of bits (referred to as a "challenge text" 510) and a second sequence of bits referred to as the "initialization vector" (IV) 520. Herein, the AP 206*b* analyzes the IV 520 in order to verify that the IV 520 falls within the first partitioned region as described above. If not, the IV 520 is regenerated and analyzed. Optionally, the AP 206*b* can maintain a listing (database) 311 of IVs used for authentication to ensure that the IV 520 has not been generated before or communicate with other APs to verify that they have not previously used the proposed IV 520.

If the IV 520 falls within the first partitioned region, the challenge text 510 and the IV 520 are transferred to the WU 208*c*. The WU 208*c* encrypts the received challenge text 510 using a combination of the IV 520 and the shared secret key (SK) 430 that was previously negotiated by the wireless unit 208*c* and the AP 206*b* as described below in FIG. 6. This produces a "challenge response" 540, which is sent to the AP 206*b* for authentication purposes. This allows the AP 206*b* to control the partitioning between IVs used for authentication and IVs used for encrypting data frames. Also, this provides a mechanism for protecting against replay attacks. A response 540 that contains a different IV is discarded.

Figure 6:
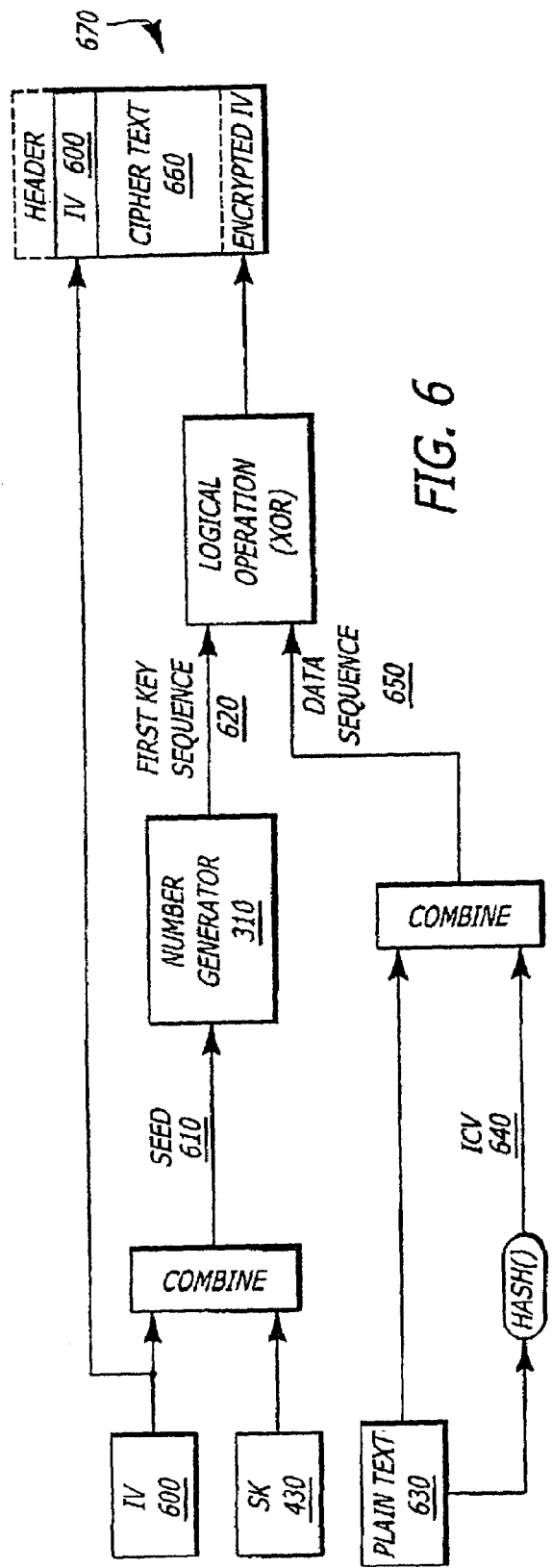
FIG. 6 is an exemplary embodiment of a WEP encryption sequence for the present invention.

Referring now to FIG. 6, an exemplary embodiment of a WEP encryption sequence is shown. Initially, an initialization vector (IV) 600 is produced by a first device (e.g., AP or WU) that is in communication with a second device (e.g., WU or AP). The IV 600 is analyzed to determine whether it falls within the first partitioned region. If the IV 600 is produced during the authentication sequence, the IV 600 is regenerated and analyzed if it does not fall within the first partition region. Similarly, if the IV 600 is produced for WEP encrypting during data communications, the IV 600 is regenerated and analyzed if it falls within the first partition region.

Otherwise, the IV 600 is combined with the shared secret key (SK) 430 to produce a seed 610. The seed 610 is input into a number generator 310, which outputs a first key sequence 620. The "first key sequence" 620 is a pseudo-random sequence of bytes greater in length than the number of data bytes of information to be encrypted (referred to as "plaintext" 630).

The plaintext 630 is combined with its integrity check value (ICV) 640 to produce a data sequence 650. The "ICV" 640 is a hash value of the plaintext 630 for use to verify the integrity of the plaintext 630 after transmission. The first key sequence 620 and the data sequence 650 undergo a logical operation (e.g., an exclusive-OR "XOR") to encrypt the plaintext 630. The encrypted plaintext is referred to as "ciphertext" 660. The ciphertext 660 is included in a data frame 670 with a header information 671 and the IV 600.

Figure 7:
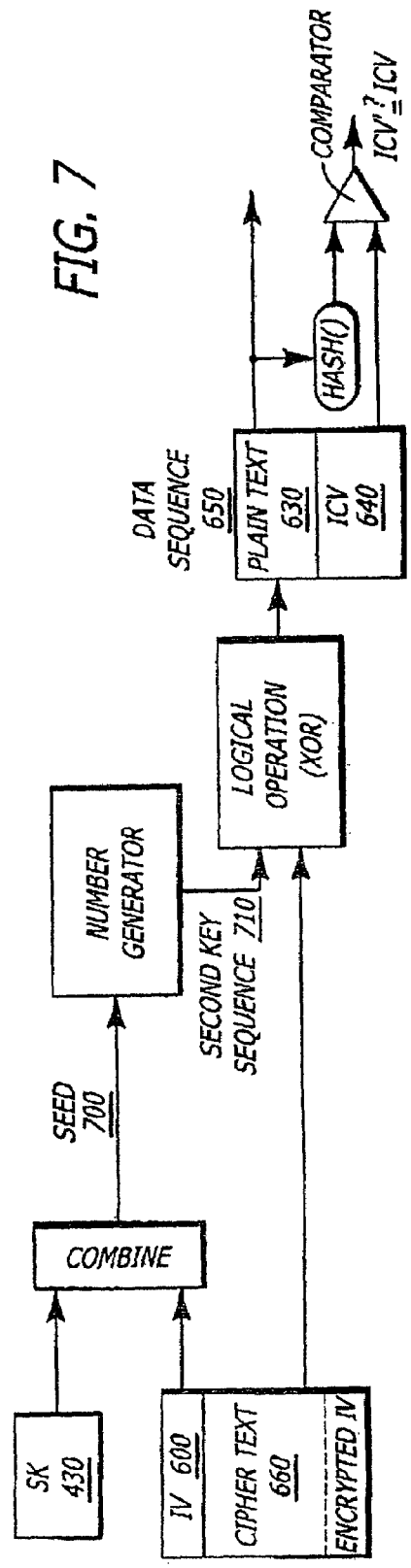
FIG. 7 is an exemplary embodiment of a WEP decryption sequence for the present invention.

Referring to FIG. 7, an exemplary embodiment of a WEP decryption sequence is shown. The WEP decryption sequence commences with the arrival of the frame 670. The IV 600 is recovered from the data frame 670 and combined with a secret key (e.g., same as SK 430) stored at the second device to produce a seed 700. For this example, the seed 700 is input into a number generator (e.g., pseudo-random number generator such as RC4), which outputs a second key sequence 710. The second key sequence 710 and the ciphertext 660 from the data frame 670 undergo a logical operation (e.g., XOR) to recover the original plaintext 630 and the ICV 640. The integrity of the communications is checked by performing a hash operation on the recovered plaintext 630 to produce a check ICV (ICV') 720. If the ICV 640 does not match ICV' 720, an error in the communications has occurred. Thus, the plaintext 630 is not utilized. Otherwise, the plaintext 630 is used.

Figure 8:
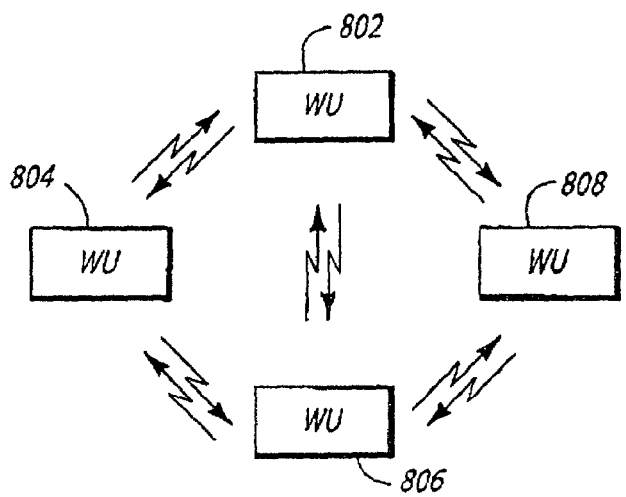
FIG. 8 is a second exemplary embodiment of a wireless network system utilizing WEP encryption and decryption sequences of FIGS. 4–7.

It is contemplated that alternative communication schemes may be used. For example, the secure communications may be established between multiple wireless units (WUs) as shown in FIG. 8. In this embodiment, the wireless network system 800 comprises two or more wireless units (WU) that can communicate with each other via a wireless link. In this example, four WUs 802, 804, 806 and 808 are shown, each of which can communicate with the remaining units via the wireless link. In contrast to the wireless network systems of FIGS. 1 and 3, this wireless network system 800 does not use a wired backbone network or APs. This type of system 800 is known in the relevant art as an "ad hoc" wireless network system. The WEP encryption sequence and the WEP decryption sequence are performed between WUs in the same manner as described in FIGS. 6 and 7.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An authentication method comprising:
   generating an initialization vector at a first electronic device;
   determining at the first electronic device whether the initialization vector falls within a first group of initialization vectors by determining whether a selected series of bits of the initialization vector has been set, the first group including a plurality of initialization vectors solely used in connection with an authentication sequence; and
   encrypting information using in part the initialization vector for return to a second electronic device if the initialization vector falls within the first group.

2. The authentication method of claim 1, wherein the first electronic device is a wireless unit.

3. The authentication method of claim 1, wherein the second electronic device is an access point.

4. The authentication method of claim 1, wherein prior to generating the initialization vector, the method comprises receiving the information from the second electronic device by the first electronic device.

5. The authentication method of claim 4, wherein the information is a challenge text.

6. The authentication method of claim 5, wherein the challenge text is a first sequence of bits and the initialization vector is a second sequence of bits produced by a number generator.

7. The authentication method of claim 4, wherein the number generator is a pseudo-random number generator.

8. An authentication method comprising:
   generating an initialization vector at a first electronic device;
   determining at the first electronic device whether the initialization vector falls within a first group of initialization vectors, the first group including a plurality of initialization vectors solely used in connection with an authentication sequence;
   encrypting information using in part the initialization vector for delivery to a second electronic device if the initialization vector falls within the first group; and
   regenerating a second initialization vector if the initialization vector fails to fall within the first group.

9. The authentication method of claim 1, wherein the selected series of bits is continuous.

10. The authentication method of claim 5, wherein prior to receiving the challenge text, the method further comprises negotiating a shared secret key between the first electronic device and the second electronic device.

11. The authentication method of claim 10, wherein the encrypting of the information includes
   combining the initialization vector with the shared secret key; and
   repeatedly performing bitwise Exclusive-OR (XOR) operations on the challenge text using a combination of the initialization vector with the shared secret key.

12. The authentication method of claim 5 further comprising:
   transmitting both the encrypted challenge text and the initialization vector to the second electronic device;
   decrypting the encrypted challenge text using both the initialization vector and a prestored copy of the shared secret key to recover a challenge text; and
   comparing the recovered challenge text with the challenge text.

13. A method for authenticating a wireless unit in communications with an access point, comprising:
   transmitting a challenge text from the access point to the wireless unit;
   receiving an encrypted challenge text and an initialization vector from the wireless unit, the initialization vector falling within a first group of initialization vectors, the first group including a plurality of initialization vectors solely used in connection with an authentication sequence, the plurality of initialization vectors of the first group forming a discontinuous series of bits; and
   decrypting the encrypted challenge text using both the initialization vector and a pre-stored copy of a shared secret key to recover a challenge text.

14. The method of claim 13, wherein the challenge text is a first sequence of bits.

15. The method of claim 14, wherein the initialization vector is a second sequence of bits produced by a number generator.

16. The method of claim 15, wherein the number generator is a pseudo-random number generator.

17. The method of claim 13, wherein prior to transmitting the challenge text, the method further comprises negotiating the shared secret key between the access point and the wireless unit.

18. The method of claim 13, wherein the decrypting of the encrypted challenge text includes
   combining the initialization vector with the shared secret key; and
   using a combination of the initialization vector and the shared secret key as a key material loaded to decrypt the encrypted challenge text.

19. An electronic device comprising:
   means for generating an initialization vector;
   means for determining whether the initialization vector falls within a first group of initialization vectors by determining whether a selected series of hits of the initialization vector has been set, the first group including a plurality of initialization vectors solely used in connection with an authentication sequence; and
   means for encrypting information using the initialization vector for return to a source for the information using in part the initialization vector if the initialization vector falls within the first group.

20. The authentication method of claim 1, wherein the determining whether the initialization vector falls within the first group includes determining whether the initialization vector forms numeric values within a range.

21. The authentication method of claim 1, wherein the selected series of bits is discontinuous.

22. The method of claim 13 wherein the plurality of initialization vectors of the first group form numeric values within a range.

23. The method of claim 14, the plurality of initialization vectors of the first group forms a continuous series of bits.

24. An authentication method comprising:
   determining whether an initialization vector falls within a first group of initialization vectors by determining whether a selected series of bits of the initialization vector has been set, the first group including a plurality of initialization vectors solely used for authentication of a first electronic device; and
   encrypting information using in part the initialization vector for return to the first electronic device if the initialization vector falls within the first group.

25. The authentication method of claim 24, wherein the first electronic device is an access point.

26. The authentication method of claim 24, wherein the selected series of bits is continuous.

27. The authentication method of claim 24 being conducted within a second electronic device and, wherein the encrypting of the information includes
   combining the initialization vector with a shared secret key used by the first electronic device and the second electronic device; and
   repeatedly performing bitwise Exclusive-OR (XOR) operations on the challenge text using a combination of the initialization vector with the shared secret key.

* * * * *